Jan. 13, 1959          J. R. CARY          2,867,990
SPRAY TYPE EVAPORATIVE COOLER
Filed Jan. 24, 1956
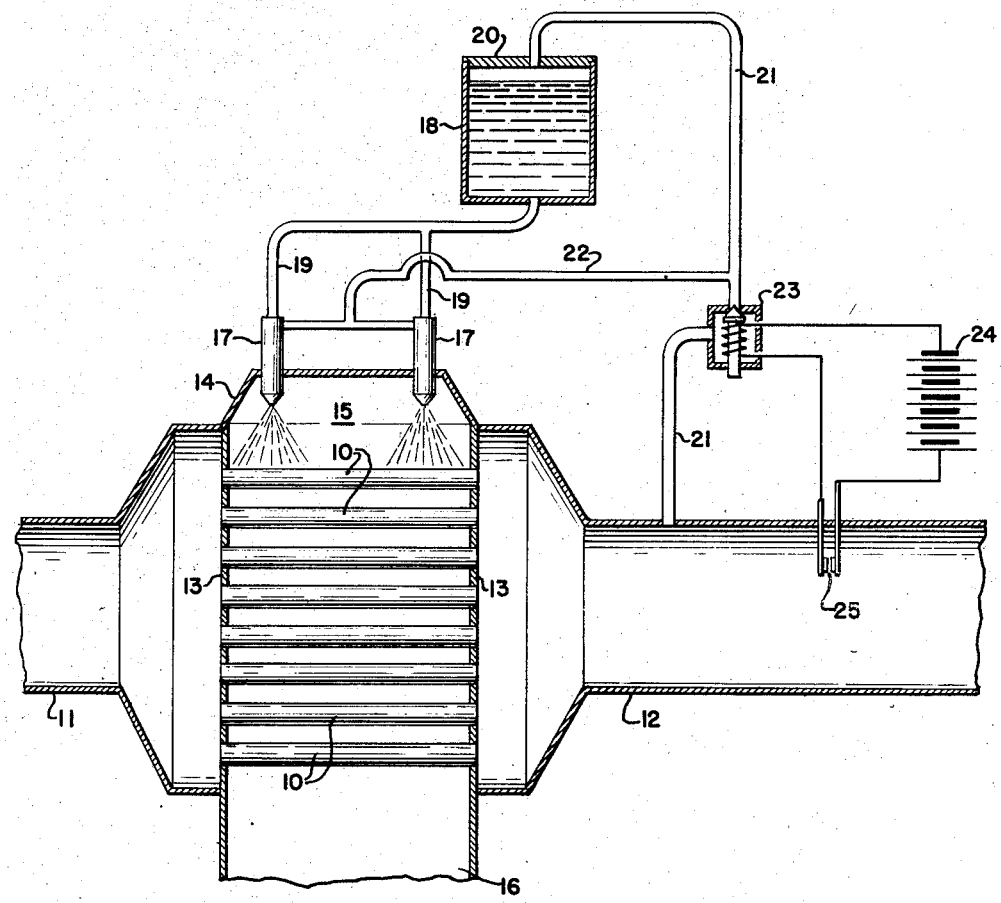
JOHN R. CARY,
INVENTOR.
BY

2,867,990

SPRAY TYPE EVAPORATIVE COOLER

John R. Cary, Redondo Beach, Calif., assignor to The Garrett Corporation, Los Angeles, Calif., a corporation of California Application January 24, 1956, Serial No. 560,991

2 Claims. (Cl. 62—171)

This invention relates generally to spray type evaporative coolers and particularly to a spray type evaporative cooler that is especially suited for use in high speed aircraft.

While the invention has particular utility for use in high speed aircraft, it is to be understood that its utility is not limited thereto. It is to be further understood that the term "aircraft" as used herein refers to any type of vehicle or device that travels within the earth's atmosphere or above it.

In evaporative coolers used in aircraft, for example, compressed hot air or gas may be cooled by passing it through the cooler in heat exchange relation to a flow of coolant normally composed of ambient atmospheric air into which an evaporative substance, such as water, is sprayed. In aircraft traveling at very high speed, any air introduced into the cooler from the ambient atmosphere will be greatly heated. In rockets and guided missiles attaining speeds of 1,000 to 1,500 miles per hour, for example, the temperature of the air entering the cooler may be in the range of 250° F. If this air were utilized as a coolant in an air-to-air heat exchanger, the cooled air or gas would be too hot for refrigeration or cooling purposes. If an evaporative substance were sprayed into such high temperature coolant air, a considerable quantity of the evaporative substance would be consumed in reducing the temperature of the air.

It is an object of the present invention to overcome the above disadvantage by providing an evaporative cooler in which ambient air is precluded from flowing through the cooler.

There is, additionally, a drag penalty incurred when ram air is directed into a cooler of an aircraft, and it is a further object of the invention to provide an evaporative cooler in which only a small amount or the pressure alone of the air or other gaseous fluid cooled in the cooler is utilized to force the spray of the evaporative substance into the cooler, thus eliminating the drag penalty associated with the momentum change of the cooling fluid.

It is a still further object of the invention to provide an evaporative cooler that sprays the evaporative substance into the cooler only when necessary to meet cooling requirements.

Other and further objects of the invention will become apparent from the following description of a preferred form of the invention, and from the accompanying drawing in which is shown a schematic sketch of an evaporative cooler incorporating the features of the invention.

Referring now to the drawing, there is shown a cooler of the evaporative type having a first passage comprising a plurality of fluid passages which may be of any convenient shape or form but which, for purpose of illustration, are shown as tubes 10. A high pressure fluid to be cooled is conducted through a duct 11 from a source such as a compressor of a gas turbine engine, not shown, to the tubes 10 and is conveyed from the tubes to a point of use through a duct 12. A plurality of walls 13 are provided to support the ends of the tubes 10 and form a second passage of the cooler in heat exchange relation to the first passage.

One end of the second passage is enclosed by a housing 14 to form a spray chamber 15 and the opposite end of the passage is provided with an outlet 16 open to the surrounding atmosphere.

A plurality of spray nozzles 17 are mounted within the spray chamber 15 and are connected to the outlet of a reservoir 18 containing an evaporative substance, such as water, by conduits 19. Nozzles 17 are shown as being of the pneumatic spray type, but may be of non-pneumatic, or mechanical or pressure atomization type.

The reservoir 18 is closed and made air-tight by an integrally connected cover 20. A conduit or bleed line 21, connected at one end to the duct 12 adjacent the discharge end of the tubes 10 and at its opposite end to the cover 20, is provided for bleeding fluid for pressurizing the evaporative substance in the reservoir 18. A second conduit or bleed line 22 connecting the spray nozzles 17 with the bleed line 21 may be provided as shown, for operating the nozzles 17. If the nozzles 17 are of mechanical or pressure atomization type then bleed line 22 may be omitted.

A solenoid valve 23, actuated by a power means 24 in response to a thermoswitch 25 located in the duct 12 downstream of the discharge end of the tubes 10, is placed in the bleed line 21 to control the flow of bleed air to the reservoir 18 and the spray nozzles 17.

The spray nozzles 17 are arranged to spray the evaporative substance into the surface of the tubes 10 and are cut in and out depending upon the temperature of the air contacting the thermoswitch 25. When the temperature of the air contacting the thermoswitch 25 is equal to or below a predetermined value, the thermoswitch is held open, the circuit to the solenoid valve 23 is broken, and the solenoid is de-energized. When the solenoid is de-energized, the valve 23 is held in the closed position and the flow of bleed air to the reservoir 18 and the spray nozzles 17 is shut off. Thus when the temperature of the air contacting the thermoswitch 25 is equal to or below a predetermined value, the flow of the evaporative substance from the nozzles 17 onto the tubes 10 is shut off. When the temperature of the air contacting the thermoswitch 25 is above the predetermined value, the thermoswitch closes the circuit to the valve 23 and the solenoid is energized. When the solenoid is energized, the valve 23 is opened and the bleed air flows through the bleed lines 21 and 22 to pressurize the reservoir 18 and actuate the spray nozzles 17. Thus the evaporative substance is sprayed from the nozzles 17 onto the tubes 10 only when the temperature of the air contacting the thermoswitch 25 is above the predetermined value.

The evaporative cooler of the present invention requires only a small amount of fluid bled from the system. Since no other cooling medium is used, wastage of the evaporant is minimized. Only a slight amount of the latent cooling capacity of the evaporant is consumed in reducing the temperature of the fluid bled from the system. However, since the weight ratio of the evaporative substance to air may be of the order of 3 or more to 1, and since the time of contact is short, most of the evaporative substance can be expected to evaporate directly on the tubes of the cooler, thus producing nearly direct cooling of the hot fluid without waste of the evaporant on an intermediate medium.

When pneumatic type spray nozzles are employed, a secondary purpose of the fluid bled from the system is to carry the evaporative substance onto the tubes of the cooler, and to aid in sweeping the spray chamber 15 of vaporized and/or unvaporized evaporant.

What is claimed is:

1. A spray type evaporative cooler, comprising: a first pass in said cooler having heat transfer wall means; a first duct for conducting fluid from a source to said first pass; a second duct for conducting fluid from said first pass to a point of use; a second pass in heat transfer relationship to said first pass; means completely enclosing one end of said second pass and forming a spray chamber; outlet means at the other end of said second pass open to ambient atmosphere; means in said spray chamber for spraying an evaporative substance onto the surface of said heat transfer wall means in said second pass for cooling said fluid flowing through said first pass; a reservoir for storing and supplying said evaporative substance to said spray means; conduit means for conducting a flow of fluid from said second duct to said reservoir and said spray means; valve means for controlling the flow of fluid to said reservoir and said spray means; and means responsive to the temperature of the fluid discharged from said first pass for actuating said valve means.

2. A spray type evaporative cooler, comprising: a first pass in said cooler having heat transfer wall means; a first duct for conducting fluid from a source to said first pass; a second duct for conducting fluid from said first pass to point of use; a second pass in heat transfer relationship to said first pass; means completely enclosing one end of said second pass and forming a spray chamber; outlet means at the other end of said second pass open to ambient atmosphere; means in said spray chamber for spraying an evaporative substance onto the surface of said heat transfer wall means in said second pass for cooling said fluid flowing through said first pass; a reservoir for storing and supplying said evaporative substance to said spray means; conduit means for conducting a flow of fluid from said second duct to said reservoir and said spray means; valve means for controlling the flow of fluid to said reservoir and said spray means; means for actuating said valve means; and means responsive to the temperature of the fluid discharged from said first pass for controlling said valve actuating means.

References Cited in the file of this patent

UNITED STATES PATENTS

| 1,966,275 | Wright | July 10, 1934 |
| 2,033,185 | Dodd | Mar. 10, 1936 |
| 2,454,883 | Olstad et al. | Nov. 30, 1948 |
| 2,663,500 | Holtzclaw | Dec. 22, 1953 |